Nov. 26, 1968     D. F. WRIGHT     3,413,550
INDUCTION METER HAVING MAGNETICALLY-SUPPORTED ROTOR
Original Filed Feb. 26, 1960     2 Sheets-Sheet 1

INVENTOR
David F. Wright
BY *C. L. Freedman*
ATTORNEY

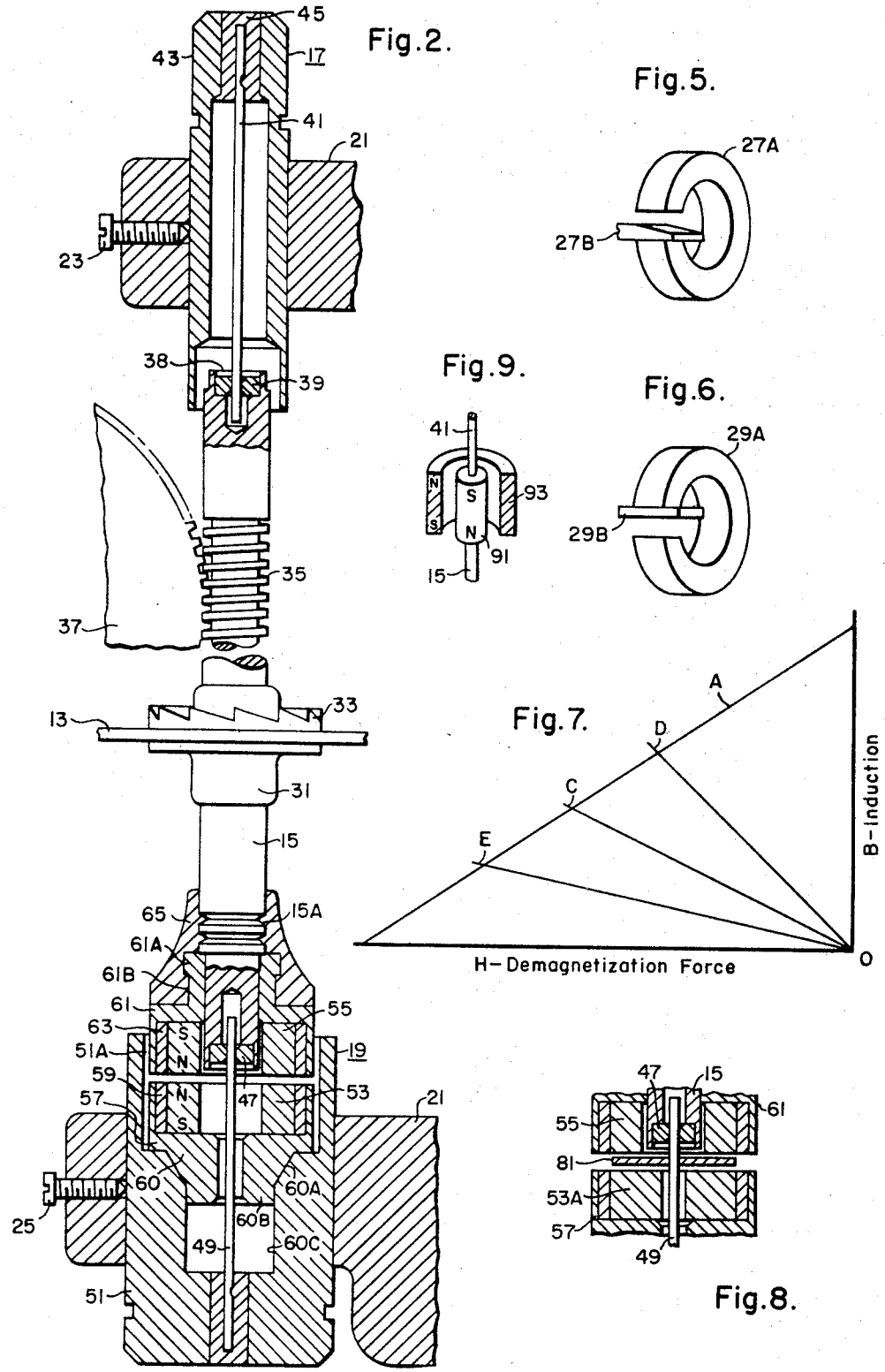

United States Patent Office 3,413,550
Patented Nov. 26, 1968

1

3,413,550
INDUCTION METER HAVING MAGNETICALLY-
SUPPORTED ROTOR
David F. Wright, Raleigh, N.C., assignor to Westinghouse
Electric Corporation, East Pittsburgh, Pa., a corporation of Pennsylvania
Original application Feb. 26, 1960, Ser. No. 11,335, now
Patent No. 3,143,704, dated Aug. 4, 1964. Divided and
this application May 26, 1964, Ser. No. 370,168
2 Claims. (Cl. 324—152)

ABSTRACT OF THE DISCLOSURE

An induction meter has a rotatable electroconductive armature and two damping magnet fields which vary in cross-section oppositely in a direction parallel to the armature axis.

This application is a division of my patent application Ser. No. 11,335, filed Feb. 26, 1960, now Patent 3,143,704.

This invention relates to rotatable structures and has particular relation to mechanisms for magnetically supporting a rotor for rotation about a vertical axis.

It has been heretofore proposed that a rotor be magnetically supported for rotation. According to one proposal two magnets are employed in attraction for this purpose. According to a second proposal two magnets are employed in repulsion for the same purpose.

In accordance with the invention, two permanent magnets are employed for supporting a rotor for rotation about a vertical axis. The magnets desirably have coercive forces in excess of 1000 oersteds and preferably in excess of 1200 oersteds. Magnets of the ceramic or ferrite type are particularly suitable. Such material may have the chemical composition $MO.6Fe_2O_3$ wherein M may represent barium, strontium or lead. Material having the composition $BaO.6Fe_2O_3$ is commercially available and is satisfactory. Such a magnet may have a coercive force in excess of 1500 oersteds and has excellent resistance to corrosion.

In a preferred embodiment of the invention, each of the ferrite magnets is provided with a pair of circular poles of different diameters which are concentric relative to the axis of rotation of the rotor unit. Each of the magnets preferably is ring-shaped and is magnetized in an axial direction. The magnet is located within a cup-shaped member of soft magnetic material, the rim of the cup constituting one of the poles of the magnet. Two of these cup-shaped magnetic members are positioned with their open ends adjacent each other and in axial alignment. The magnets contained within the members are magnetized to provide like poles adjacent each other in order to produce a repulsion effect.

The provision of the cup-shaped members has several favorable effects. Not only is the efficiency of the magnetic mounting materially improved, but the effect of temperature variations on the repulsion force can be materially reduced. The cup-shaped members are readily machined to provide accurate cylindrical surfaces which minimize any magnetic irregularities due to structural defects of the magnets. The magnetic members provide some shielding for the permanent magnets and consequently reduce external field influence on the permanent magnets by reducing the interaction between the magnet leakage field and any external fields which may be present adjacent the mounting. The cup-shaped members produce large supporting fields which are substantially less sensitive to the axial position of the rotor unit. The cup-

2 shaped member additionally facilitates the holding of the associated permanent magnet and provides good mechanical protection for such magnet.

In a preferred embodiment of the invention resilient pins are provided to locate the rotor unit accurately with respect to its axis of rotation. In one embodiment of the invention, one of the pins may have an electroconductive disc secured thereto and positioned in the field of one of the magnets employed for the mounting. Movement of the pin with respect to the magnet induces eddy currents in the disc and consequently damps such movement of the pin.

In an embodiment of the invention, the rotor unit may include an electroconductive disc which is located in the air gaps of damping magnets. Such magnets provide magnetic fields for the electroconductive disc and act to damp or retard rotation of the disc by a retarding force which is proportional to the rate of rotation of the disc. Preferably, such damping magnets provide a resultant magnetic field for the disc which is virtually the same for all positions which the disc may occupy in a direction parallel to the axis of rotation of the disc. If one of the damping magnets provides an air gap field which varies from point to point in a direction parallel to the axis of rotation, a second damping magnet preferably is provided which has a magnetic field tending to compensate for the magnetic field variations of the first magnet.

It is therefore an object of the invention to provide an improved magnetic mounting for a rotor unit which is designed for rotation about a vertical axis.

It is also an object of the invention to provide an improved construction of a damping magnet assembly for damping rotation of a rotor.

Other objects of the invention will be apparent from the following description taken in conjunction with the accompanying drawings, in which;

FIG. 2 is a view in side elevation with parts broken away showing the rotor assembly and associated parts of a watt-hour meter of FIG. 1;

FIGS. 5 and 6 are views in perspective of damping magnets which may be employed in place of the damping magnets shown in FIG. 1;

FIG. 7 is a graph showing various operating points on the demagnetization curve of a permanent magnet;

FIG. 8 is a view in sectional elevation with parts broken away showing a modified magnetic mounting; and FIG. 9 is a perspective view of a modified form of magnetic mounting with parts broken away.

Figure 1:
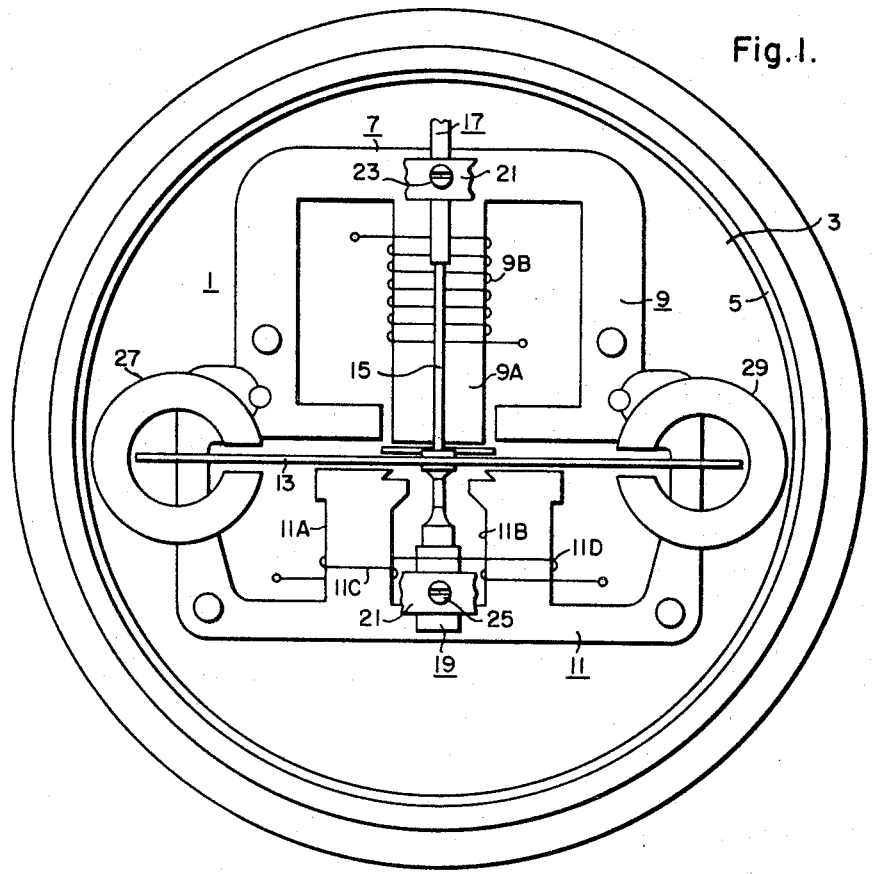
FIGURE 1 is a view in front elevation with parts broken away of a watt-hour meter having a magnetic mounting embodying the invention.

Referring to the drawing, FIG. 1 shows an alternating-current induction-type watt-hour meter 1 located within a conventional casing which includes a base 3 and a cup-shaped glass cover 5. The watt-hour meter has a stator unit which includes an electromagnet of substantially conventional construction. In the specific embodiment of FIG. 1, the electromagnet includes a magnetic structure 7 having a voltage section 9 and a current section 11 which are separately constructed and secured to each other. The voltage section 9 includes a voltage pole 9A having a voltage winding 9B positioned to direct magnetic flux through the voltage pole. As is well understood in the art, the voltage winding 9B has a large number of turns of conductor having a small cross-section.

The current section 11 of the magnetic structure has two current poles 11A and 11B which respectively have windings 11C and 11D associated therewith. In accordance with customary practice, the windings 11C and 11D have a relatively small number of turns of electric conductor material having a large cross-section and are energized in accordance with current flowing in an electrical circuit with which the watt-hour meter is associated. The current windings are so associated with the current poles that when the winding 11C directs magnetic flux upwardly in the pole 11A, the winding 11D directs current magnetic flux downwardly in the pole 11B.

The poles 9A, 11A and 11B are spaced to provide an air gap in which an electroconductive disc 13 is mounted for rotation. It will be understood that when the voltage winding 9B is energized in accordance with the voltage of an alternating-current circuit and the windings 11C and 11D are energized in accordance with current flowing in the alternating-current circuit a shifting magnetic field is established in the air gap containing the disc 13. This shifting magnetic field results in the application of a torque acting between the disc or armature 13 and the electromagnet to produce rotation of the disc. This torque is proportional to the power flowing in the associated alternating current circuit.

The electroconductive disc or armature 13 is mounted for rotation about a vertical axis on a shaft 15. This shaft cooperates with an upper-bearing assembly 17 and a lower-bearing assembly 19 to mount the disc 13 for rotation with respect to the electromagnet. The upper-bearing assembly 17 is secured to the electromagnet in any suitable manner as by means of a frame 21 and a set screw 23. In an analogous manner, the lower bearing assembly 19 is positioned by the frame 21 and by a set screw 25.

In order to damp rotation of the disc 13, one or more damping magnets may be employed. In the embodiment of FIG. 1, two damping magnets 27 and 29 have air gaps within which the disc 13 is mounted for rotation. Consequently, the damping magnets retard rotation of the disc 13 with a force or torque which is dependent on the rate of rotation of the disc.

As shown more clearly in FIG. 2, the disc 13 is secured to the shaft 15 in any suitable manner. In a preferred embodiment of the invention, the disc 13 is provided with an opening through which the shaft 15 extends. A hub of die-casting material 31 is then formed about the shaft and disc center in order to hold the two parts together. The upper portion of the hub may be contoured to provide a ratchet wheel 33 having upwardly-directed ratchet teeth. This ratchet wheel may be associated with a pawl to prevent reverse rotation of the disc 13 as set forth in the copending Tringali application, Ser. No. 763,732, filed Sept. 26, 1958, now abandoned. The shaft 15 may be constructed of a suitable material such as aluminum and may have teeth cut therein to form a worm 35 which cooperates with a worm wheel 37. The worm wheel 37 forms part of the conventional register which is driven by the shaft 15 to register energy consumed by an alternating-current electrical circuit with which the watt-hour meter is associated.

In order to guide the upper end of the shaft 15, the upper end is provided with a cup-shaped recess 38 for receiving a suitable ring bearing 39. This ring bearing is constructed of a suitable material such as bronze or sapphire which is held in position in the shaft 15 in any suitable manner as by a staking or a spinning operation. Preferably the ring bearing 39 is constructed of graphite.

The upper bearing assembly 17 includes a pin 41 which has its upper end secured to a surrounding sleeve 43 in any suitable manner as by means of a die-casting alloy 45. The lower end of the pin 41 extends through the ring bearing 39 to locate the upper end of the shaft on its axis of rotation. In order to minimize the transmission of vibration and noise between the rotor and stator units, the pin 41 is constructed of a resilient material such as stainless steel and has a substantial length between the ring bearing 39 and the point of attachment of the pin to the sleeve 43.

In an analogous manner, the lower end of the shaft 15 is provided with a ring bearing 47. The lower bearing assembly 19 includes a pin 49 which is secured to a sleeve 51 and which extends through the ring bearing 47. The pin 49 corresponds to the pin 41 of the upper-bearing assembly.

In order to support the weight of the rotor unit which includes the disc 13, the shaft 15 and associated parts, two permanent magnets 53 and 55 are mounted concentric with the axis of rotation of the rotor assembly. The permanent magnet 53 is secured to the stator unit whereas the magnet 55 is secured to the rotor unit. The permanent magnets are magnetized axially in such directions as to present like poles adjacent to each other. For exemplary purposes, it assumed that the permanent magnet 53 is magnetized to provide an upper north pole and a lower south pole indicated in FIG. 2 respectively by the reference characters N and S. In an analogous manner, the upper permanent magnet 55 is provided with a lower north pole and an upper south pole. As a result of these magnetizations, the permanent magnets develop a repulsion force which is sufficient to support the weight of the rotor assembly. Consequently, the only friction present in the system is that between the pins 41 and 49 and their associated ring bearings 39 and 47.

The permanent magnets 53 and 55 preferably are constructed of a material having a high coercive force. Excellent results have been obtained from materials known as ceramic or ferrite permanent magnet materials. Such a material may have a chemical formula $MO \cdot 6Fe_2O_3$ wherein M represents a material such as barium, lead or strontium, Fe represents iron and O represents oxygen. In a preferred embodiment of the invention, the barium-containing material is employed and is represented by the chemical formula $BaO \cdot 6Fe_2O_3$. Such a material may have a coercive force in excess of 1000 oersteds and material having a coercive force of the order of 1600 oersteds has been employed.

Although the parameters of the permanent magnet material depend on the specific rotor to be supported the following dimensions have been found suitable for a watt-hour meter. Each of the permanent magnets 53 and 55 is constructed of a barium ferrite in the form of a ring. The ring has an outer diameter of 0.270 inch, an inner diameter of 0.140 inch and an axial length of 0.125 inch. The weight of such a permanent magnet is only 0.40 gram.

As employed in a repulsion permanent-magnet system, the ceramic material offers extremely high resistance to both self and external demagnetization. Furthermore, the material is extremely stable and non-corrosive.

Although the permanent magnets 53 and 55 may be employed without provision of other magnetic material in the mounting, a number of important advantages are obtained by reducing the air gaps of the permanent magnets. To this end, each of the permanent magnets 53 and 55 is asociated with a soft magnetic cup.

As shown in FIG. 2, the permanent magnet 53 is located in a cup 57 constructed of a soft magnetic material such as a low-carbon steel or cold-rolled steel. For a permanent magnet 53 having the dimensions previously given, the cup 57 may have a cylindrical wall portion with an inner diameter of 0.320 inch and an outer diameter of 0.344 inch. The permanent magnet 53 may be secured to the cup 57 by cement or in any other suitable manner. In a preferred embodiment of the invention, the permanent magnet is secured to the cup by means of a solder 59 having a melting point which does not injure the magnet. Such a solder may be of any suitable composition. For example, it may have a composition by weight of 80% lead 5% tin and 15% antimony. Such material has a melting point of about 275° C. which does not harm the permanent magnet. The cup 57 in turn is secured in any suitable manner to the sleeve 51 as by means of a press fit. As representative of the suitable material, the sleeve 51 may be constructed of brass.

Preferably the cup 57 is provided with a hollow conical base portion 60 concentric about the axis of the shaft 15. This conical base portion 60 rests snugly in a conical seat 60A provided in the sleeve 51 to center the cup accurately relative to the sleeve. The conical base portion has a tubular projection 60B which may have a light knurl on its outer surface and which has a press fit in a cylindrical recess provided in the sleeve 51.

In an analogous manner, the permanent magnet 55 may be secured within a cup 61 which is formed of soft magnetic material similar to that employed in the cup 57. It will be assumed that solder 63 is employed for securing the permanent magnet 55 to the cup 61. The cup in turn may be secured to the shaft 15 in any suitable manner, for example, the shaft may have a portion received as a press fit within a cylindrical opening extending through the central portion of the cup. If desired, the cup 61 may be secured to the shaft 15 by a suitable die-casting material 65, such as a lead-base, die-casting material. The cup 61 may have a tubular projection 61A of reduced diameter provided with a groove 61B in its outer surface. The shaft 15 may have grooves 15A formed therein. The grooves provide interlocks between the material 65 and the projection 61A and the shaft 15.

By inspection of FIG. 2 it will be noted that the sleeve 51 has a tubular projection 51A which surrounds not only the cup 57 but a substantial part of the cup 61. Thus the projection 51A affords physical protection for the cups and for the air gap between the cups. Because of its non-magnetic construction the projection 51A can extend close to the air gap for maximum physical protection.

Because of the presence of the cup, the north pole face of each of the permanent magnets is in effect surrounded by a concentric south pole face, the two pole faces being coupled to each other through an efficient magnetic circuit. The soft steel cup then constitutes a flux return path which materially increases the magnetic flux available for lift of the rotor unit.

Furthermore, the cups are constructed of a readily machinable material and consequently can be provided with extremely accurate concentric outside diameters. This is desirable in order to minimize radial forces acting between the rotor assembly and the stator. Furthermore, the provision of cups facilitates the utilization of permanent magnets 53 and 55 having imperfections such as chips therein. When brittle permanent-magnet material such as the ceramic materials are employed, it is desirable to permit the utilization of chipped permanent-magnet material.

The cups also provide a measure of shielding for the permanent magnets and decrease the likelihood of interaction between the permanent-magnet fields and the electro-magnet.

It has been found further that the cups materially reduce the effect of ambient temperature variations on the position of the rotor unit. As the ambient temperature increases, the magnetization of the ferrite decreases. This tends to cause the rotor unit to drop slightly. To compensate for this drop, the cups 57 and 61 may be constructed of a material having a magnetic permeability which increases with temperature. With the low-carbon steel cups mentioned above it has been found possible to decrease the reversible change in displacement of the rotor unit over a temperature range of −40° C. to 55° C. by almost 60%. When the temperature departs from an initial value the rotor unit position may change slightly. However, when the temperature returns to its initial value the rotor unit also returns to its initial position.

Figure 3:
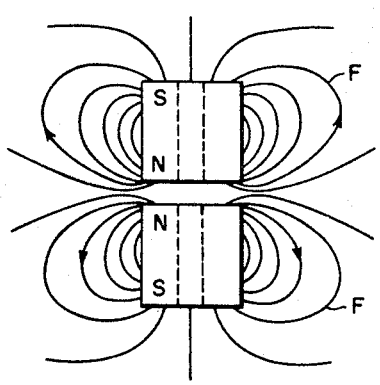
FIG. 3 is a view in side elevation of a prior art magnetic mounting showing magnetic field lines of the suspension diagrammatically.
Figure 4:
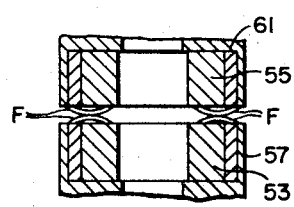
FIG. 4 is a view in sectional elevation of the magnetic mounting of FIG. 1 with parts broken away and with magnetic field lines diagrammatically shown.

The advantages flowing from the provision of the soft magnetic cups for the permanent magnets may be considered further by reference to FIGS. 3 and 4. FIG. 3 represents two permanent magnets heretofore proposed for a magnetic mounting. The permanent magnets are magnetized to provide poles as indicated by the polarity markings N for north pole and S for south pole. The magnetic fields F for these two permanent magnets are plotted in FIG. 3. An extremely large leakage field is present.

In FIG. 4, a field is shown for the magnetic mounting of FIGS. 1 and 2. It will be observed that the leakage field is materially reduced and the magnetic field is concentrated to a large extent in the gap between the two cups. Not only is the efficiency of the magnetic mounting materially improved, but a flat magnetic field configuration is obtained which makes the magnetic mounting less responsive to the radial displacement of the rotor unit from its correct position.

FIG. 7 shows a demagnetization curve A for the ferrite permanent magnet 53 plotted in the customary manner with ordinates B representing induction usually measured in gausses and abscissae H representing demagnetizing force, usually measured in oersteds.

The ferrite magnet 53 alone has an operating point determined by the intersection of a line C with the demagnetization curve A.

If the ferrite magnet 53 is placed in its cup 57, the operating point is represented by the intersection of a line D with the demagnetization curve A. When the magnet 53 and its cup 57 are in the complete mounting as shown in FIGS. 1 and 2 the operating point is represented by the intersection of a line E with the demagnetization curve A.

In FIG. 1, it is assumed that each of the permanent magnets 27 and 29 has pole faces of equal size and shape on opposite sides of the disc 13. With this assumption, displacement of the disc 13 in a vertical direction from the position illustrated in FIG. 1 has little effect on the damping provided by the damping magnets 27 and 29.

In some cases, it is desirable to provide an adjustable pole piece for at least one of the damping magnets. Such a pole piece 27B is associated with a permanent magnet 27A in FIG. 5 which may be employed in place of the permanent magnet 27 of FIG. 1. Because of the pole piece 27B provided on the lower pole face of the magnet 27A, the damping torque produced by the damping magnet 27A depends to some extent on the vertical position of the disc in the air gap of the magnet.

If the damping magnet 27A of FIG. 5 is employed in place of the damping magnet 27 of FIG. 1, the watt-hour meter may be made substantially independent of the vertical position of the rotor assembly by replacing the damping magnet 29 of FIG. 1 by the damping magnet 29A of FIG. 6.

As shown in FIG. 6, the permanent magnet 29A has a pole piece 29B secured to the upper pole face of the damping magnet. Thus, as the disc moves upwardly, the area of the field produced by the magnet 27A which is cut by the disc decreases whereas the area of the field produced by the magnet 29A which is cut by the disc increases. Because of these opposite variations in the two fields, the damping of the disc is virtually independent of its vertical position.

The construction shown in FIGS. 1 and 2 has been found to provide effective performance. However, if it is desirable to damp radial vibration of the rotor unit, the pin 49 may have mounted thereon an electroconductive disc 81 (FIG. 8) such as a copper disc. The remaining parts of FIG. 8 are similar to those of FIGS. 1 and 2 except for a slightly greater spacing between the cups 57 and 61 to provide adequate space for the disc 81, and except for a permanent magnet 53A which differs from the permanent magnet 53 of FIGS. 1 and 2 only in its inner diameter.

Radial vibration of the rotor unit tends to move the pin 49 and the disc 81 mounted thereon in a radial direction. Such movement causes the disc 81 to cut magnetic flux produced by the magnet 53A. Consequently, eddy currents are induced in the disc 81 and produce forces which oppose or damp the vibration which cause the movement of the disc.

The inner diameter of the magnet 53 of FIGS. 1 and 2 may be reduced materially with a resultant increase in efficiency, with no increase in outer dimensions and with no increase in weight of the rotor unit. This is illustrated in FIG. 8 wherein the magnet 53A has an inner diameter merely large enough to provide running clearance for the pin 49. As a specific example, the inner diameter may be 0.063 inch.

By reference to FIG. 1, it will be noted that the magnets employed in the bearing assembly 19 are spaced appreciably from the cover 5. In a watt-hour meter as actually constructed, it was impossible to bring a demagnetizing coil closer than 2¼ inches to the magnets 53 and 55. Although the ceramic magnets are extremely resistant to demagnetization, the increased spacing available in the design of FIG. 1, is also effective in preventing demagnetization of magnetic materials used in the bearing system.

In the bearing systems previously discussed, permanent magnets are employed in repulsion and ceramic magnets are particularly desirable for such applications. However, ceramic magnets also are desirable for attraction-type suspension systems. For example, let it be assumed that the watt-hour meter of FIGS. 1 and 2 has an attraction suspension associated with the upper bearing assembly, as illustrated in FIG. 9.

In FIG. 9, a permanent magnet 91 is secured to the upper end of the shaft 15. This permanent magnet is surrounded by a tubular permanent magnet 93 which is fixed to the stator. The two permanent magnets are magnetized in axial directions to provide poles as indicated by the markings N for north pole and S for south pole. By inspection of FIG. 9, it will be observed that forces of attraction operate between the two permanent magnets to suspend or support the rotor unit associated with the shaft 15. Such a construction is well known in the art.

In accordance with the further aspect of the invention, the two magnets 91 and 93 are constructed of the ceramic materials previously described.

Although the invention has been described with reference to certain specific embodiments thereof, numerous modifications falling within the spirit and scope of the invention are possible.

I claim as my invention:
1. In combination: a stator unit, a rotor unit, means mounting the rotor unit for rotation relative to the stator unit about a verical axis, said rotor unit having an operating position relative to the stator unit which may vary over a range along said vertical axis, one of said units comprising an air-gap-containing magnetic means having a magnetic field therein and the other of said units comprising an electroconducting armature having a portion positioned in the magnetic field to develop damping torque acting between the units in response to relative rotation of said units about said vertical axis, said magnetic means providing a magnetic field proportioned to develop a damping torque acting between the units which is independent of the vertical position of said rotor unit relative to the stator unit over said range, the armature comprising a disc concentric about the axis, and the magnetic means comprising a first permanent magnet unit providing a first magnetic field portion and a second permanent magnet unit providing a second magnetic field portion, said first magnetic field portion having a horizontal cross-section which increases in a first vertical direction, and said second magnetic field portion having a horizontal cross-section which decreases in said first vertical direction, each of said permanent magnet units comprising a C-shaped permanent magnet having pole faces on opposite sides of said disc, each of the permanent magnets having a first pole face which is substantially larger than its other pole face, the first pole faces of said two permanent magnet units being on opposite sides of said disc.

2. The invention claimed in claim 1 wherein one of said permanent magnets comprises a pole piece providing the larger of said pole faces which is adjustable for varying the magnitude of the associated magnetic field portion.

References Cited
UNITED STATES PATENTS
| | | | |
|---|---|---|---|
| 1,332,464 | 3/1920 | Harris | 324—152 |
| 2,254,698 | 8/1941 | Hansen | 324—155 X |

FOREIGN PATENTS
| | | |
|---|---|---|
| 717,660 | 10/1954 | Great Britain. |

RUDOLPH V. ROLINEC, *Primary Examiner.*

G. R. STRECKER, *Assistant Examiner.*